United States Patent [19]
Anderson

[11] Patent Number: 4,831,967
[45] Date of Patent: May 23, 1989

[54] ANIMAL LIFT FRAME

[76] Inventor: Charles D. Anderson, P.O. Box 53, Potter Valley, Calif. 95469

[21] Appl. No.: 140,027

[22] Filed: Dec. 31, 1987

[51] Int. Cl.⁴ ............................................. A01D 3/00
[52] U.S. Cl. ................................................... 119/102
[58] Field of Search .............................. 119/102, 151; 294/67.21, 74, 81.3; D34/28, 35, 42; D30/144, 145, 151

[56] References Cited

U.S. PATENT DOCUMENTS

| | | | |
|---|---|---|---|
| 3,028,186 | 4/1962 | Skubic | 294/81.3 X |
| 3,596,968 | 8/1971 | Holm | 294/81.3 |
| 3,751,097 | 8/1973 | Jones et al. | 294/81.3 |
| 4,394,041 | 7/1983 | de Nachtegaal | 294/81.3 |
| 4,416,480 | 11/1983 | Moody | 294/81.3 X |
| 4,489,677 | 12/1984 | Handley | 119/102 |
| 4,597,602 | 7/1986 | McGriff | 294/81.3 |
| 4,626,012 | 12/1986 | Weldele | 294/81.3 |

FOREIGN PATENT DOCUMENTS

| | | | |
|---|---|---|---|
| 2529068 | 1/1977 | Fed. Rep. of Germany | 294/81.3 |
| 33244 | 3/1977 | Japan | 294/81.3 |
| 623809 | 9/1978 | U.S.S.R. | 294/81.3 |
| 660915 | 5/1979 | U.S.S.R. | 294/81.3 |
| 992382 | 1/1983 | U.S.S.R. | 294/81.3 |

*Primary Examiner*—John Weiss
*Assistant Examiner*—R. Thomas Price
*Attorney, Agent, or Firm*—Larry D. Johnson

[57] ABSTRACT

The animal lift frame provides a mechanically adjustable support structure for restraint and skeletal support of an animal undergoing veterinary care. The lift frame includes a generally rectangular frame portion with front and rear beam members connected by a center beam, and right and left side rail members. The center beam carries a slidable counter balance/lifting eye member attachable to a center chain for lifting of the entire apparatus by a common hoist means. A series of adjustable length stabilizer straps extend from a point on this center chain to a fixed or adjustable lifting eye on each of the front and rear beam and right and left rail members. A harness or sling for supporting the underside of the animal is removably secured to the right and left rails.

3 Claims, 4 Drawing Sheets

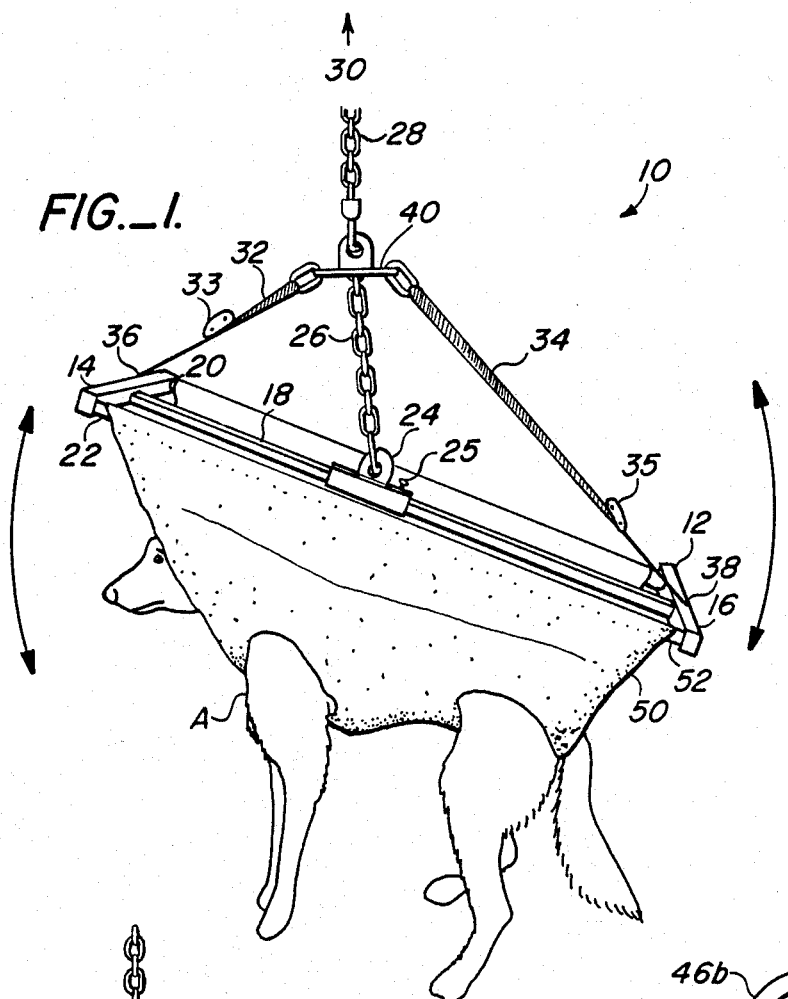
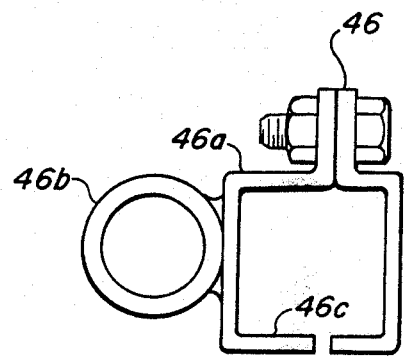
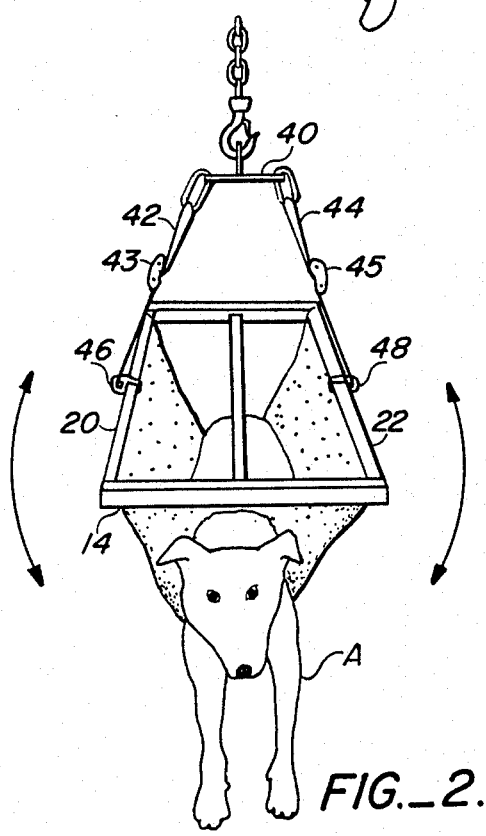
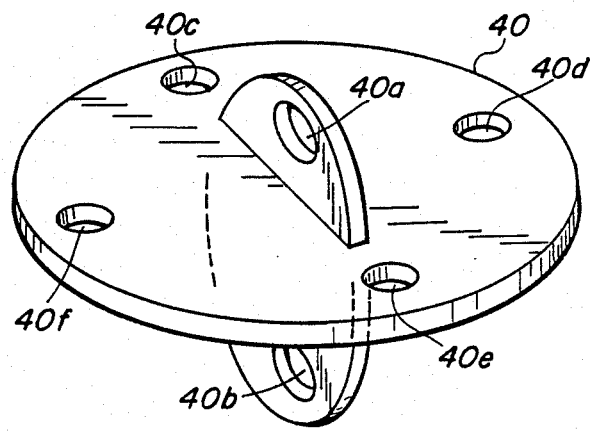
FIG._1.
FIG._2.
FIG._3.
FIG._4.

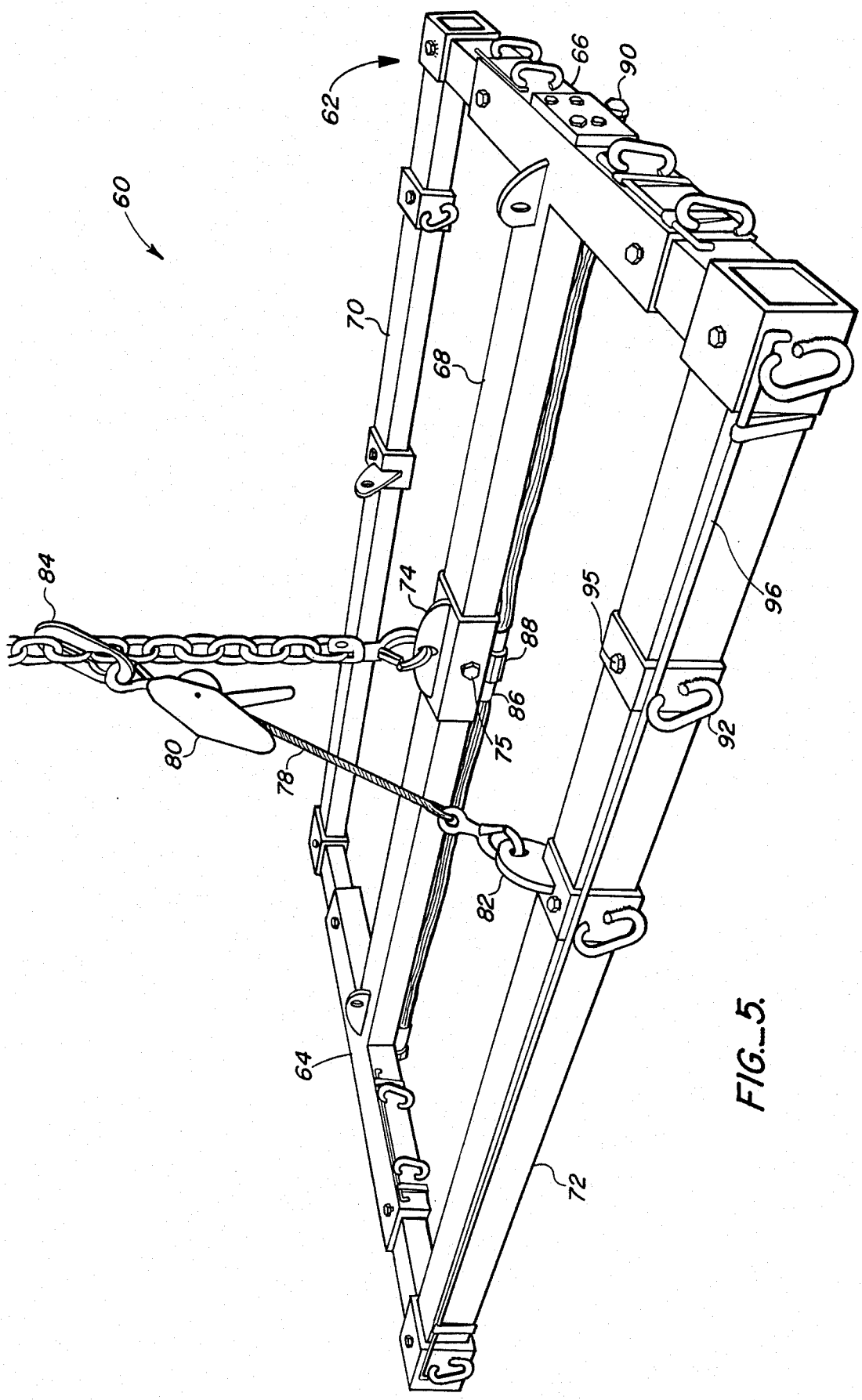
FIG._5.

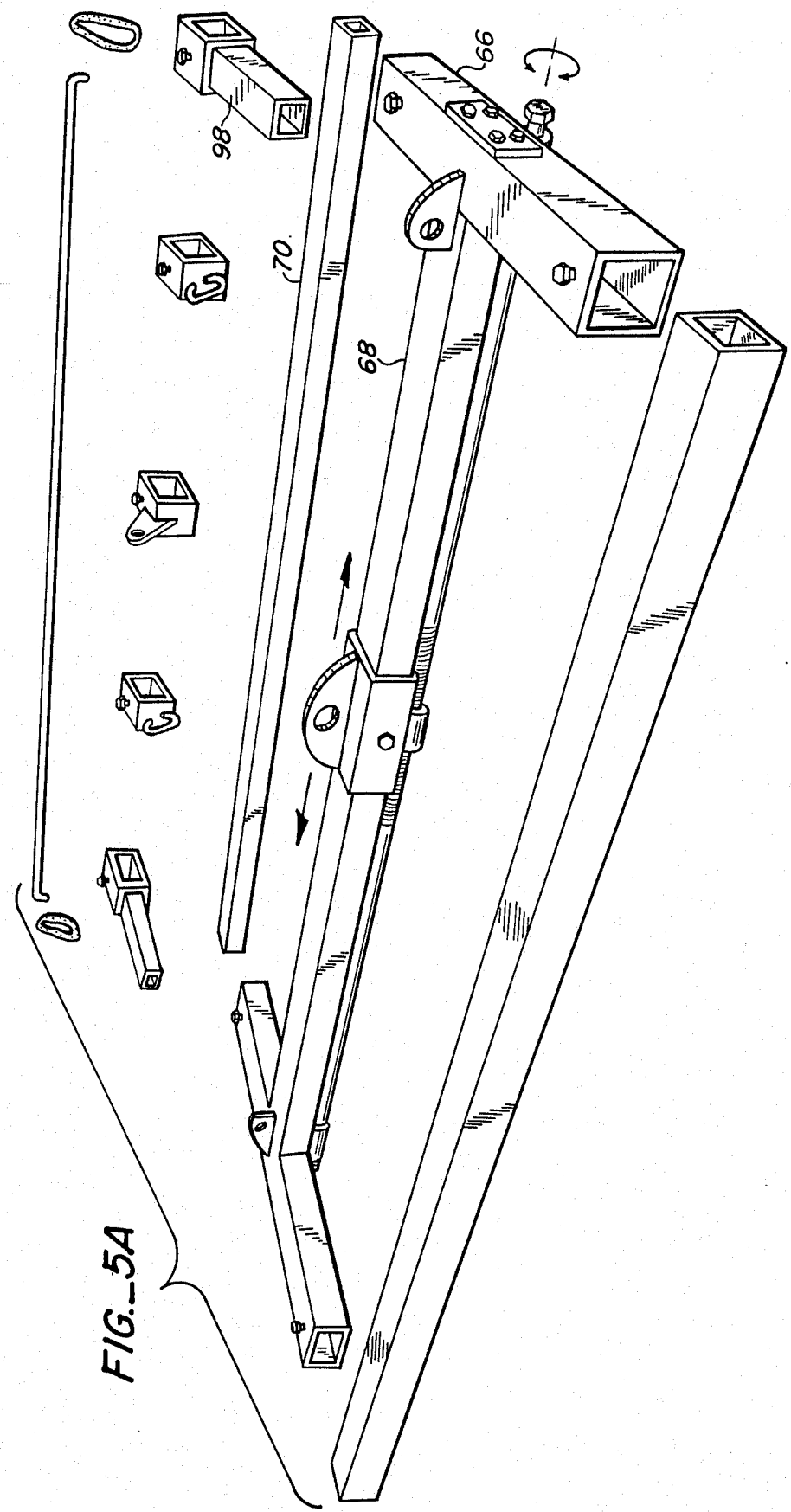
FIG._5A

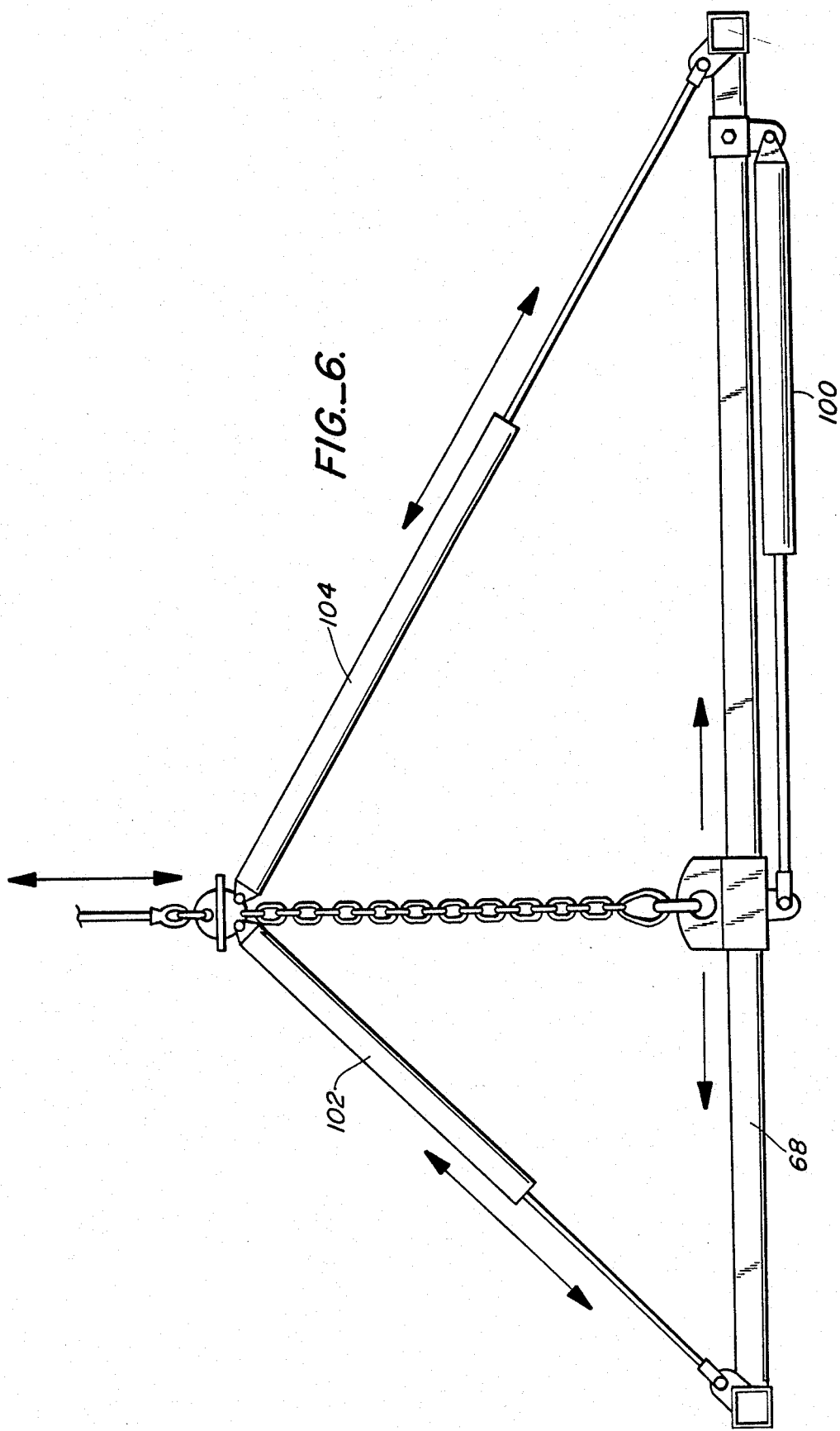
FIG._6.

ANIMAL LIFT FRAME

BACKGROUND OF THE INVENTION

1. Field of the Invention

This invention relates generally to support structures, and more specifically to an improved lifting frame for supporting an animal.

2. Description of the Prior Art

Veterinary medicine often involves the care of weak, diseased, or disabled animals. In some situations, proper care may require that the animal be treated while standing up, which can be difficult for the animal, and awkward or even dangerous for the veterinarian. For example, some equine neurological cases expose the veterinary practitioner to the substantial risk of working with a large uncoordinated animal, which may be unable to support itself. Treatment of such animals may include placing them in a suitable restraint and skeletal support structure to enable proper medical care and rehabilitation.

Most existing animal support equipment consist of little more than a standard hoist and sling. Such an apparatus is often difficult to operate and balance, and is not easily adjustable for treatment and support for specific portions of the animal's body.

SUMMARY OF THE INVENTION

The animal lift frame of this invention provides a mechanically adjustable support structure for restraint and skeletal support of an animal undergoing veterinary care. The lift frame includes a generally rectangular frame portion with front and rear beam members connected by a center beam, and right and left side rail members. The center beam carries a slidable counter balance/lifting eye member attachable to a center chain for lifting of the entire apparatus by a common hoist means. A series of adjustable length stabilizer straps extend from a point on this center chain to a fixed or adjustable lifting eye on each of the front and rear beam and right and left rail members. A harness or sling for supporting the underside of the animal is removably secured to the right and left rails.

In operation, the animal is placed in the sling, and the sling attached to the right and left rail members of the animal lifting frame. The center chain is attached to a standard hoist mechanism which can then be lifted, elevating the animal lift frame and the animal. The counter balance/lifting eye is adjusted fore or aft on the center beam to select the appropriate nose up or down ("pitch") attitude for appropriate treatment of the animal. The front, rear, right, and left stabilizer straps are then adjusted and tightened to secure this pitch adjustment. Further adjustment can be made both in the pitch attitude (effected by adjusting the counter balance/lifting eye and/or the front and rear stabilizer straps) and/or the side to side ("roll") attitude (effected by adjusting the right and left side stabilizer straps).

BRIEF DESCRIPTION OF THE DRAWINGS

FIG. 1 is a partially cutaway elevated side view of a simple embodiment of the animal lift frame of this invention, shown in use to support the forelegs of a small animal, and illustrating only the center chain and front and rear stabilizer straps (the right and left side stabilizer straps are omitted here for clarity);

FIG. 2 is a partially cutaway front perspective view of the small lifting frame illustrated in FIG. 1, and illustrating only the right and left side stabilizer straps (the center chain and front and rear stabilizer straps are omitted here for clarity);

FIG. 3 is an elevated side view of an adjustable side lifting eye used with the small animal lift frame of this invention;

FIG. 4 is a perspective view of a chain union plate used with the small animal lift frame of this invention;

FIG. 5 is a partially cutaway perspective view of a modified version of the animal lift frame of this invention, such as would be used to support a large animal, and illustrating only the center chain and left side stabilizer (the right side, front, and rear stabilizers are omitted here for clarity);

FIG. 5A is a partially exploded perspective view of part of the frame portion of the large animal lift frame illustrated in FIG. 5; and FIG. 6 is an elevated side cross-sectional view of an alternate adjustment mechanism for the animal lift frame of this invention.

DETAILED DESCRIPTION OF A PREFERRED EMBODIMENT

FIG. 1 is a partially cutaway elevated side view of a simple embodiment of an animal lift frame 10 of this invention, shown in use to support the forelegs of a small animal A. Frame 10 includes frame portion 12, comprising a front beam 14 and rear beam 16, connected by a center beam 18, right side rail 20, and left side rail 22. A counterbalance/lifting eye mechanism 24 is slidably attached to center beam 18, and can be locked in a particular place on the beam by means of a locking screw 25. Center chain 26 connects to the counter balance, and is itself connectable to a chain 28 of a common hoist means 30 (not illustrated), either directly or through a union plate 40.

The pitch attitude of the frame, and therefore the animal in the frame, is selected by proper adjustment of the counterbalance on the center beam. This pitch is then stabilized by proper adjustment of front stabilizer strap 32 and front adjustment buckle 33, and rear stabilizer strap 34 and rear adjustment buckle 35, which connect from union plate 40 to front lifting eye 36 and rear lifting eye 38, respectively. (The right and left stabilizer straps are not shown in this figure). Harness or sling 50 actually supports the animal A and attaches to the frame by sling sleeves 52 which slide onto side rails 20, 22.

FIG. 2 is a partially cutaway front perspective view of the small animal lifting frame 10 illustrated in FIG. 1. Here, right side stabilizer strap 42 and adjustment buckle 43, and left side stabilizer strap 44 and adjustment buckle 45, connect from union plate 40 to right side lifting eye 46 and left side lifting eye 48, respectively. (The center chain and front and rear stabilizer straps are not shown in this figure). Thus, the "roll" (side-to-side) attitude of the frame, and therefore the animal in the frame, is selected and stabilized by proper adjustment of these right and left stabilizers. By proper adjustment of the pitch and roll attitude of the frame, the animal can be selectively supported to lift the fore legs, the hind legs, right legs, left legs, or any quadrant, while leaving the animal's other legs on the ground.

FIG. 3 is an elevated side view of an adjustable side lifting eye 46 used with the small animal lift frame 10. Lifting eye 46 includes a clamp portion 46a that fits over the side rail and sling sleeve, and an eye portion 46b for attachment to the stabilizer strap. Clamp portion 46a includes a gap area 46c for the fabric of the sling itself. Thus, this lifting eye can be moved anywhere along the side rail as necessary.

FIG. 4 is a perspective view of a chain union plate 40 used with the small animal lift frame 10. Union plate 40 include upper and lower holes 40a, b, for attachment to the hoist chain and center chain, respectively, as well as lateral holes 40c, d, e, f for attachment to the stabilizer straps.

FIG. 5 is a partially cutaway perspective view of a modified version of the animal lift frame of this invention, such as would be used to support a large animal. Large animal frame 60 includes frame portion 62, front beam 64, rear beam 66, center beam 68, right side rail 70 and left side rail 72, all analogous to the corresponding portions of the small animal frame. Similarly, counterbalance 74, locking screw 75, center chain 76, and the various stabilizers, here represented by left side stabilizer 78, comealong 80, left side lifting eye 82, and sling plate 84, are also analogous. Other than simply being larger and stronger, the large animal frame differs from the small animal frame in its adjustment features. For example, large frame 60 utilizes a counterbalance adjusting rod 86 to move counterbalance 74 fore and aft for pitch attitude. Adjusting rod 86 can thread through pillow block 88, and be driven by the turning of a rod head 90 at either end of the frame. Rod head 90 can of course be turned manually, or with an air ratchet, electric drive, or other mechanical means.

In addition, large frame 60 may include sling support hooks 92, which engage reinforced grommets on a sling. These hooks may be oriented outwards, as at hook 92, or inward, as at hook 94, and may adjust fore and aft by means by locking screw 95. Retainer bar 96 may be used to block the opening in the hooks, to prevent inadvertent sling removal.

FIG. 5A is a partially exploded perspective view of part of the frame portion of the large animal lift frame 60. This view illustrates the breakdown capability of the frame 60, for ease in transportation and storage. In addition, this view shows the width adjustment feature of the side rails. For example, right side rail 70 may be moved closer to or further from center beam 68 by proper adjustment of insert 98 into rear beam 66.

FIG. 6 is an elevated side cross-sectional view of an alternate adjustment mechanism for the animal lift frame of this invention. Here, hydraulic cylinder 100 replaces the counterbalance adjusting rod, and enables positive yet remote adjustment of the counterbalance along center beam 68, and thus pitch attitude. Also, hydraulic cylinders 102 and/or 104 can replace the front and rear stabilizers, respectively, to enable similar remote adjustment of the stabilizers. Of course, the right and left stabilizers could also be replaced by such cylinders, for similar purpose.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An animal lift frame enabling adjustment and stabilization of pitch and roll attitude, said animal lift frame comprising:
    a generally rectangular frame member comprising a front beam, rear beam, center beam and right and left side rail members;
    a counterbalance member slidably attached to said center beam;
    a center chain member attached to said counterbalance, said center chain member conditioned for attachment to a common hoist means;
    front, rear, right and left stabilizer members, extending between and connecting said center chain member to said front beam, rear beam, right rail, and left rail members respectively, said stabilizer members including adjustment means for changing their length; and
    sling means for supporting an animal, said sling means being attached to said side rails, wherein when an animal is placed in said sling means, and said center chain member is lifted by a hoist, the frame pitch attitude is adjustable by moving said counterbalance member along said center beam, and is stabilized by adjustment of said front and rear stabilizer members, and the frame roll attitude is adjusted and stabilized by adjustment of said left and right stabilizer members.

2. The animal lift frame of claim 1 including drive means for moving said counterbalance member along said center beam.

3. The animal lift frame of claim 1 including drive means for adjusting said stabilizer member length.

* * * * *